(12) United States Patent
Yoshida

(10) Patent No.: US 7,641,575 B2
(45) Date of Patent: Jan. 5, 2010

(54) HYDRAULIC TENSIONER

(75) Inventor: Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 688 days.

(21) Appl. No.: 11/039,661

(22) Filed: Jan. 19, 2005

(65) Prior Publication Data
US 2005/0227799 A1    Oct. 13, 2005

(30) Foreign Application Priority Data
Apr. 9, 2004    (JP)    ............... 2004-115870

(51) Int. Cl.
F16H 7/08    (2006.01)
F16H 7/12    (2006.01)

(52) U.S. Cl. .............. 474/109; 474/110; 474/111; 474/138

(58) Field of Classification Search .......... 474/101, 474/109, 110, 111, 136, 138
See application file for complete search history.

(56) References Cited

U.S. PATENT DOCUMENTS

| 3,725,990 | A |   | 4/1973 | Peterson et al. |
| 4,772,251 | A | * | 9/1988 | Goppelt et al. ............ 474/101 |
| 5,643,117 | A |   | 7/1997 | Dembosky |
| 5,704,860 | A | * | 1/1998 | Stief ............ 474/110 |
| 5,707,309 | A | * | 1/1998 | Simpson ............ 474/110 |
| 6,139,454 | A |   | 10/2000 | Simpson |
| 6,165,090 | A | * | 12/2000 | Simpson ............ 474/110 |
| 6,203,461 | B1 |   | 3/2001 | Watanabe et al. |
| 6,204,461 | B1 |   | 3/2001 | Bucher et al. |
| 6,244,295 | B1 |   | 6/2001 | Bartsussek et al. |
| 6,244,982 | B1 | * | 6/2001 | Merelli ............ 474/138 |
| 6,685,587 | B2 | * | 2/2004 | Rossato et al. ............ 474/109 |
| 6,811,505 | B2 |   | 11/2004 | Hashimoto et al. |
| 7,174,799 | B2 |   | 2/2007 | Yoshida |
| 7,244,204 | B2 |   | 7/2007 | Yoshida et al. |
| 2001/0009876 | A1 | * | 7/2001 | Kurohata ............ 474/110 |
| 2002/0098932 | A1 | * | 7/2002 | Hashimoto et al. ......... 474/110 |
| 2002/0142871 | A1 | * | 10/2002 | Namie et al. ............ 474/110 |
| 2003/0134703 | A1 | * | 7/2003 | Saitoh et al. ............ 474/109 |
| 2004/0266572 | A1 | * | 12/2004 | Yoshida et al. ............ 474/110 |
| 2005/0255952 | A1 |   | 11/2005 | Yoshida |
| 2005/0265856 | A1 |   | 12/2005 | Yoshida |

FOREIGN PATENT DOCUMENTS

| DE | 196 22 123 A1 | 6/1996 |
| DE | 196 51 089 A1 | 12/1996 |
| DE | 197 39 904 A1 | 9/1997 |

(Continued)

Primary Examiner—Robert A Siconolfi
Assistant Examiner—Thomas W Irvin
(74) Attorney, Agent, or Firm—Howson & Howson LLP

(57) ABSTRACT

The check valve unit of a hydraulic tensioner comprises a check ball, a ball guide and a disc-shaped retainer. The retainer is fixed to the high pressure oil chamber side of the ball guide by crimping an annular portion of the ball guide over the outer edge of the retainer so that substantially all of an annular circumferential portion of the high pressure chamber side of the retainer is held underneath the crimped portion of the ball guide. The crimped portion of the ball guide forms a recess for receiving and positioning a plunger-biasing spring. A ball seat is similarly secured to the inflow side of the ball guide by crimping.

2 Claims, 7 Drawing Sheets

FOREIGN PATENT DOCUMENTS

| | | |
|---|---|---|
| DE | 199 23 926 A1 | 5/1999 |
| EP | 0 919 744 A1 | 6/1999 |
| EP | 0 989 328 A2 | 3/2000 |
| EP | 1 223 364 A1 | 7/2002 |
| GB | 2 065 265 A | 6/1981 |
| JP | 4-77070 | 7/1992 |
| JP | 4-84953 | 7/1992 |
| JP | 6-49868 | 7/1994 |
| JP | 8 166073 | 6/1996 |
| JP | 9-203440 | 8/1997 |
| JP | 11-336855 | 12/1999 |
| JP | 2000-136860 | 5/2000 |
| JP | 2000-179721 | 6/2000 |
| JP | 2002-206603 | 7/2002 |

* cited by examiner

HYDRAULIC TENSIONER

FIELD OF THE INVENTION

This invention relates to hydraulic tensioners of the type used to apply proper tension to the timing chain or timing belt of an internal combustion engine, and relates more particularly to improvements in the check valve of a hydraulic tensioner.

BACKGROUND OF THE INVENTION

Hydraulic tensioners have been widely used to maintain tension in timing chains and timing belts which transmit rotation from the crankshaft to one or more camshafts of a vehicle engine. By maintaining proper tension, the tensioner prevents vibration of the chain or belt.

A conventional hydraulic tensioner includes a housing having a cylindrical hole, a plunger slidable in the cylindrical hole and protruding from an opening at the end thereof, and a plunger-biasing spring urging the plunger in the protruding direction. The housing and the plunger together form a high pressure oil chamber, and a check valve mechanism, comprising a metal cylinder, is fitted into the cylindrical hole of the housing to permit entry of oil into the high pressure oil chamber, but prevent reverse flow of oil out of the chamber. The check valve mechanism is pre-assembled before being fitted into the cylindrical hole of the housing, and comprises cylindrical element providing an oil passage and having a ball seat formed thereon, a check ball, a coil spring, and a lid. An example of a conventional check valve mechanism is described in Japanese Laid-Open Patent Publication No. 2002-206603 (page 1, FIG. 1).

High machining accuracy is required for production of the conventional check valve mechanism, and assembly of a hydraulic tensioner incorporating the conventional check valve mechanism is difficult.

To address these problems, I have developed the hydraulic tensioner described in my Japanese patent application No. 2003-187277 and depicted in FIGS. 6-7(C) of this application. In this hydraulic tensioner 500, the check valve unit 540 comprises a synthetic resin ball guide 542, a ball seat 544 attached to the ball guide, a check ball 541 disposed in opposed relationship to the valve seat and guided by the ball guide 542, a check ball-biasing spring 545, which biases the check ball 541 toward the valve seat, and a disc-shaped retainer 543, which limits the extent to which the check ball 541 can move away from the ball seat 544. As shown in FIGS. 7(A), 7(B) and 7(C), two protrusions 542a are provided on opposite sides of the center of the ball guide 542 on the high pressure chamber side thereof. An outer circumferential tongue 542b is provided on the ball guide for pressing against the wall of the plunger accommodating hole, adjacent the bottom end thereof. Four crimped protrusions 542c are provided at four locations on the outer circumference of the ball guide at the inlet side thereof. The retainer 543 is provided with holes 543a for receiving the protrusions 542a. An oil communication hole 543b is provided in the retainer 543. A valve seat 544a is provided on the ball seat 544 for abutting engagement with the check ball 541, and the ball seat is held in place by the four crimped protrusions 542c. The two protrusions 542a, which hold the retainer to the ball guide, are inserted into holes 543a of the retainer 543, and then crimped in order to fix the retainer to the ball guide.

Several problems are encountered in the assembly and use of the check valve structure of FIGS. 6-7 (C). The parts of the protrusions 542a that extend through holes 543a are liable to become chipped. The width of the crimped portions of the protrusions 542a is limited. The end of the plunger-biasing spring 530 is not fixed relative to the disc-shaped retainer 543. Furthermore, it is difficult to position the holes 543a in the retainer 543 so that they receive protrusions 542a of the ball guide 542. Finally, since the ball seat 544 is fixed by the four crimped protrusions 542c provided on the outer circumference of the ball guide 542, the protrusions 542c are liable to become chipped. The widths of these protrusions are also limited.

The principal object of this invention is to provide a hydraulic tensioner which can be assembled easily, and in which the check valve unit can be readily assembled and incorporated into the tensioner easily and securely.

SUMMARY OF THE INVENTION

The hydraulic tensioner in accordance with the invention comprises a housing having a plunger-accommodating hole formed therein, and a plunger. The plunger-accommodating hole has an opening at one end thereof and a bottom portion at the opposite end thereof. A plunger is slidable in the plunger-accommodating hole and protrudes through the opening in order to apply tension to a chain, a belt, or a similar traveling, flexible power transmission medium. The plunger and the housing together form a high-pressure oil chamber. The tensioner also includes a plunger-biasing spring, accommodated in the high pressure oil chamber. The spring biases the plunger in a protruding direction. A check valve unit is incorporated into the housing, within the plunger-accommodating hole and adjacent the bottom portion thereof. The check valve unit is arranged to allow flow of oil into the high-pressure oil chamber, and to prevent reverse flow of oil. The check valve unit has an outlet side facing the high pressure oil chamber and an opposite inflow side.

The check valve unit comprises a check ball, a ball seat on which the check ball can be seated to block reverse flow of oil out of the high pressure oil chamber, a ball guide in which the check ball is freely movable toward and away from the ball seat, and a disc-shaped retainer holding the check ball in the ball guide while allowing movement of the check ball within the ball guide toward and away from the ball seat. The disc-shaped retainer has a surface facing the high pressure oil chamber. This surface has an annular peripheral region, and the ball guide has an annular portion on its high pressure oil chamber side. A part of the annular portion surrounds the disc-shaped retainer and a part of the annular portion is crimped over substantially the entirety of the annular peripheral region of the disc-shaped retainer.

In a preferred embodiment, the annular portion of the ball guide forms a recess, and an end portion of the plunger-biasing spring extends into the recess, bears axially against the disc-shaped retainer, and is engaged with the annular portion of the ball guide and held thereby against radial movement.

In the preferred embodiment, the ball seat also has an annular peripheral region and is fixed to the ball guide by an annular crimped portion of he ball guide on the inflow side thereof. This crimped portion is crimped over substantially the entirety of the annular peripheral region of said ball seat.

The hydraulic tensioner of the invention maintains proper tension in a chain, a belt, or other traveling flexible power transmission medium in the same manner as a conventional hydraulic tensioner. However the tensioner exhibits a number of significant advantages over the conventional tensioner.

The disc-shaped retainer is fixed to the ball guide by crimping the ball guide over an annular region that extends substantially entirely around the periphery of the retainer. Accordingly, in contrast with the tensioner shown in FIGS. 6 and 7, in the tensioner according to the invention, the crimped portion of the ball guide provides for a stronger check valve unit, and allows the check valve unit to be assembled without careful positioning of the retainer relative to the ball guide. Furthermore, because the retainer is more securely attached to the ball guide, the check valve unit can be incorporated into the bottom portion of the plunger-accommodating hole without the risk of detachment of the retainer from the ball guide.

An additional advantage afforded by the invention is that the annular portion of the ball guide can form a recess for receiving and reliably positioning an end portion of the plunger-biasing spring, thereby avoiding wear and contact noise which would otherwise result from abnormal contact between the rear end portion of the plunger and the plunger-biasing spring.

A further advantage is afforded where the ball seat is fixed to the ball guide by an annular crimped portion of he ball guide on the inflow side thereof, and the crimped portion is crimped over substantially the entirety of an annular peripheral region of the ball seat. With the ball seat fixed to the ball guide in this manner, the check valve unit can be installed at the bottom portion of the plunger-accommodating hole, without the risk of detachment of the ball seat from the guide.

DETAILED DESCRIPTION OF THE PREFERRED EMBODIMENTS

The ball guide of the check valve unit may be composed of a synthetic resin or metal. However, it is preferably composed of synthetic resin so that crimping can be carried out by the application of heat, and assembly of the check valve unit can be carried out quickly and easily.

Figure 1:
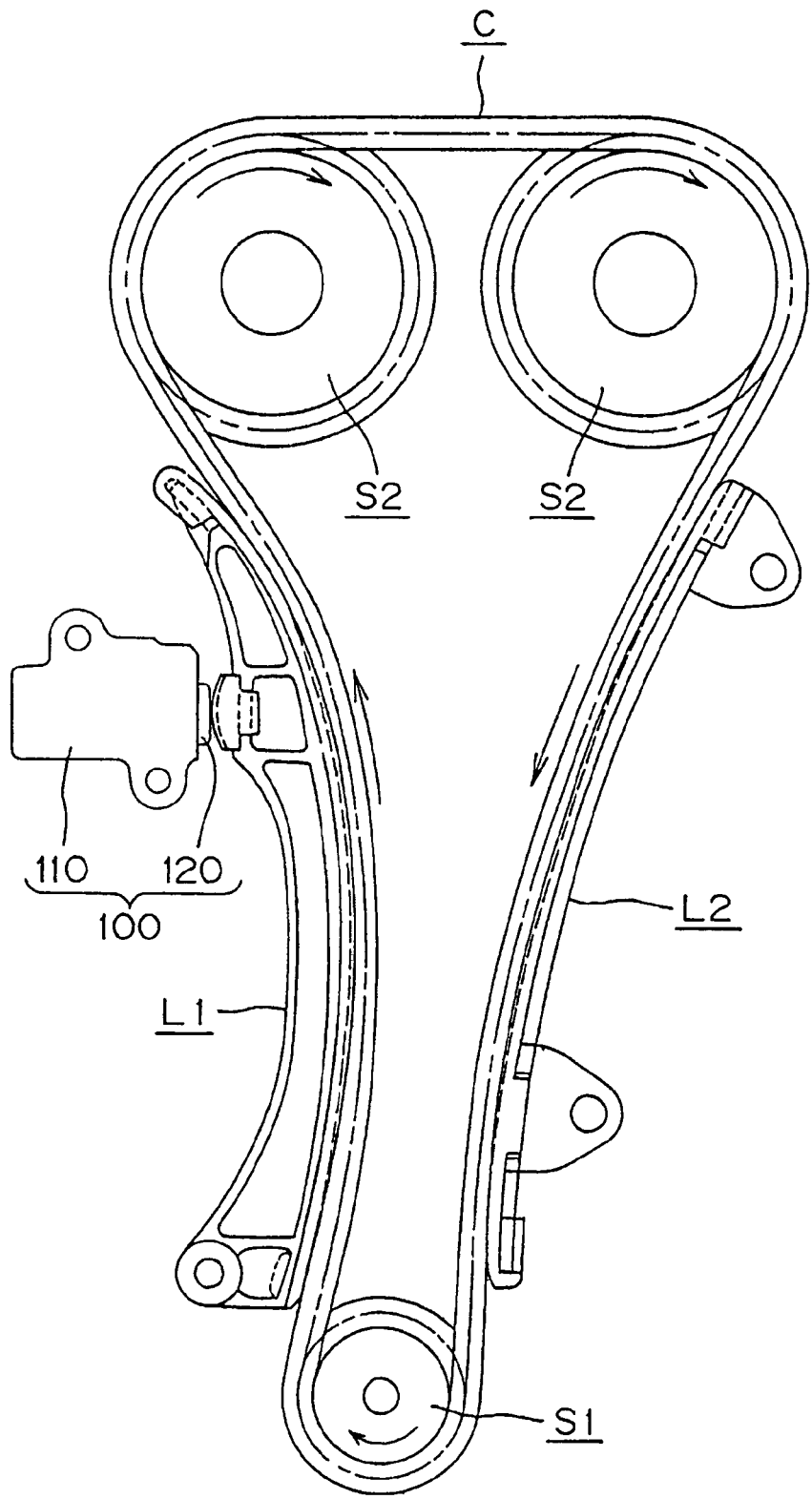
FIG. 1 is a schematic elevational view of the timing drive of a dual overhead cam internal combustion engine, in which a hydraulic tensioner in accordance with the invention is used to maintain tension in a timing chain.
Figure 2:
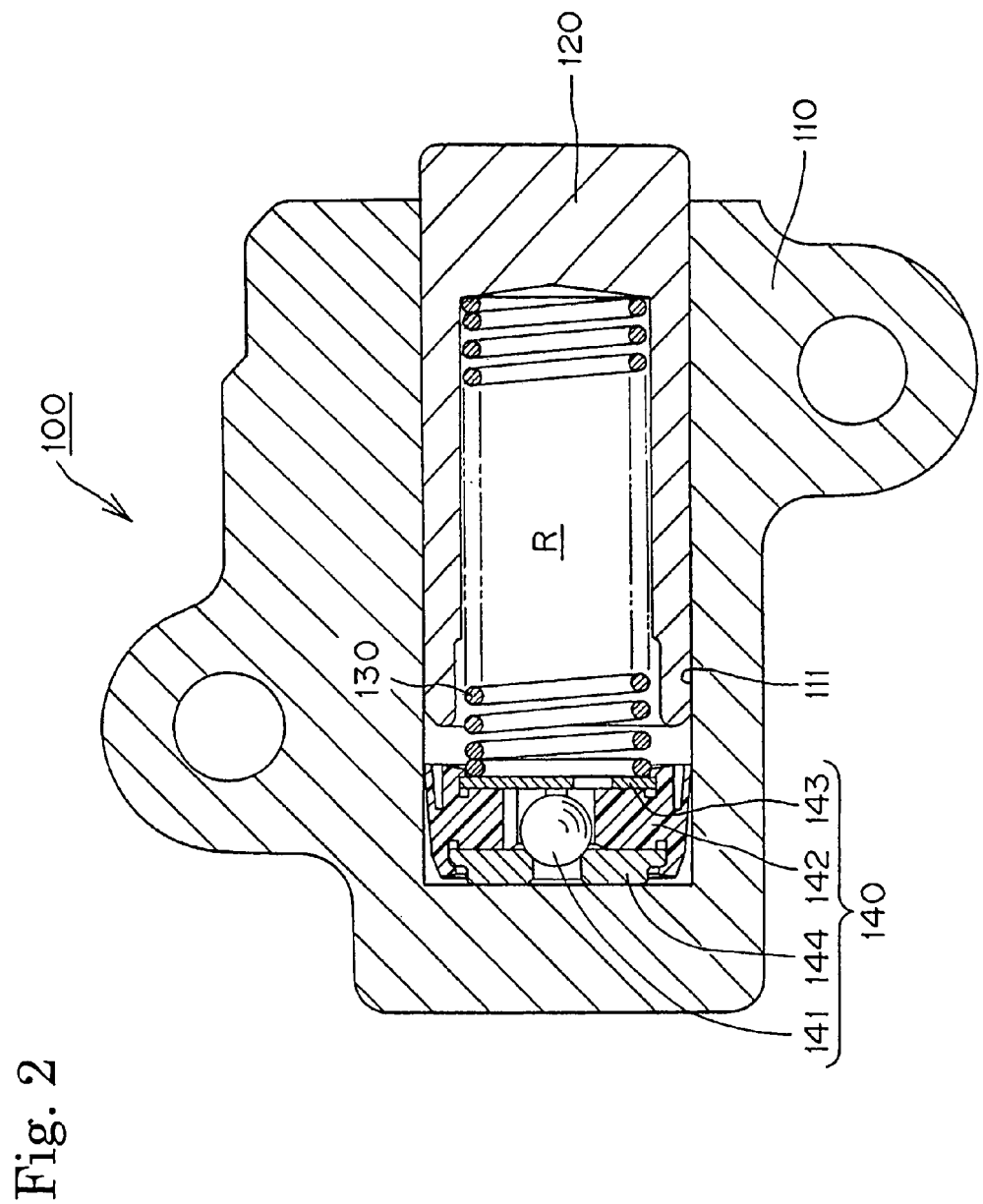
FIG. 2 is a cross-sectional view of a hydraulic tensioner in accordance with a first embodiment of the invention.

As shown in FIGS. 1 and 2, a hydraulic tensioner 100, in accordance with a first embodiment of the invention, is attached to an engine block adjacent the slack side of a timing chain C, which is in mesh with a drive sprocket S1 rotated by a crankshaft of an engine and driven sprockets S2 on valve-operating camshafts. A plunger 120 protrudes through an opening of a cylindrical plunger-accommodating hole 111 in tensioner housing 110, and applies tension to the slack side of the chain C through a pivoted lever L1 by pressing against a back surface of the lever at a location remote from the lever's pivot axis. A fixed guide L2 guides the travel of the timing chain C on the tension side thereof. Arrows in FIG. 1 indicate the directions of rotation of the sprockets and the direction of movement of the chain C.

The exterior of the plunger 120 is cylindrical, and the plunger fits slidably in the plunger-accommodating hole 111. A high pressure oil chamber R is formed by the plunger 120 and the plunger-accommodating hole 111. A coil spring 130, serving as a plunger biasing spring, is accommodated within chamber R, and biases the plunger 120 in the protruding direction.

As shown in FIG. 2, a check valve unit 140 is incorporated into the tensioner at the bottom of the plunger-accommodating hole 111. The check valve unit allows oil, supplied from the engine through a passage (not shown), to flow into the high pressure chamber R, but blocks reverse flow of oil.

The check valve unit 140 is an assembly comprising a check ball 141, a synthetic resin ball guide 142, which envelopes the check ball and in which the check ball 141 is freely movable, a disc-shaped retainer 143 on the high pressure oil chamber side of the ball guide 142 for maintaining the check ball 141 in the ball guide 142, and a metal ball seat 144, fixed to the ball guide 142 on the inflow side. The ball is engageable with the seat to block reverse flow of oil out of the high pressure oil chamber R.

Figure 3:
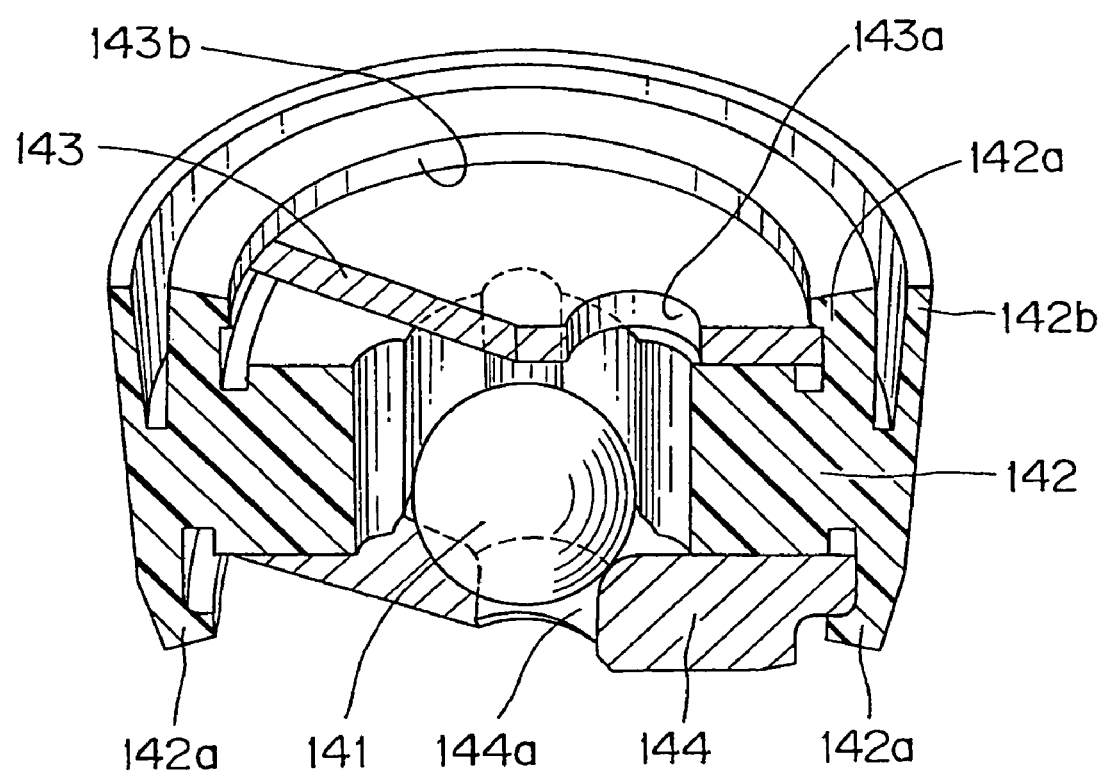
FIG. 3 is a partly broken-away perspective view of a check valve unit of the tensioner of FIG. 2.
Figure 4:
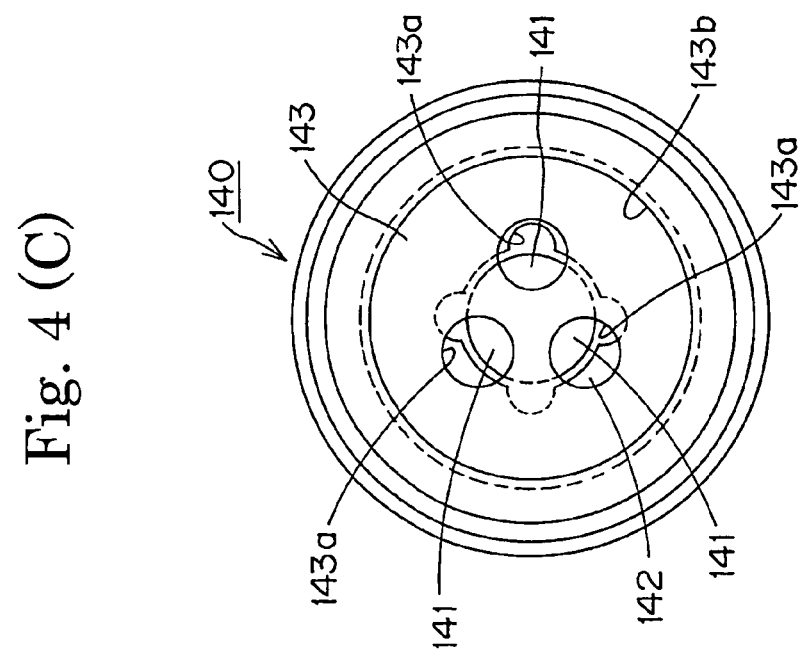
FIGS. 4(A), 4(B) and 4(C) are respectively an inlet end view, a side view, and an outlet end view of the check valve unit of FIG. 3.
Figure 4:
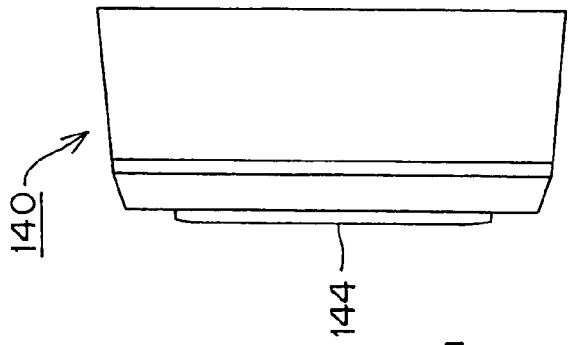
Figure 4:
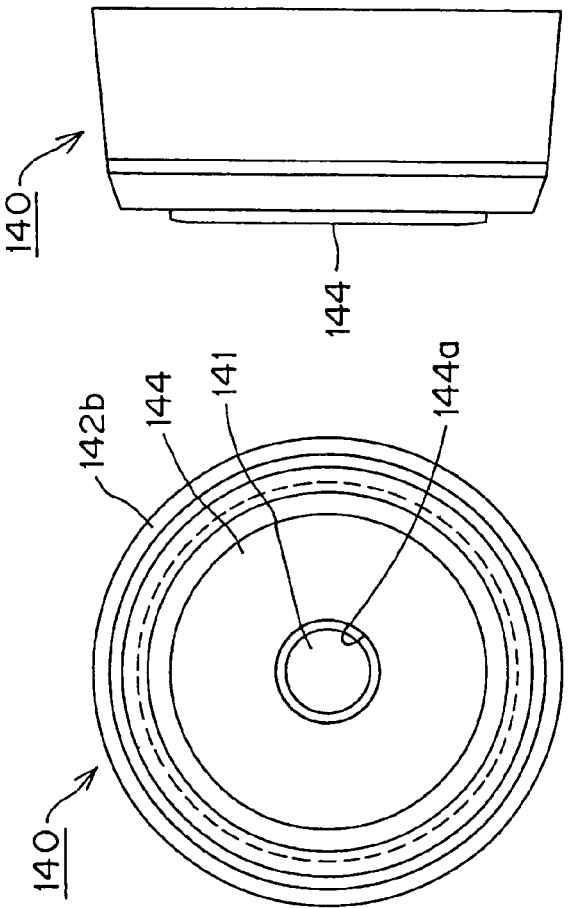
Figure 6:
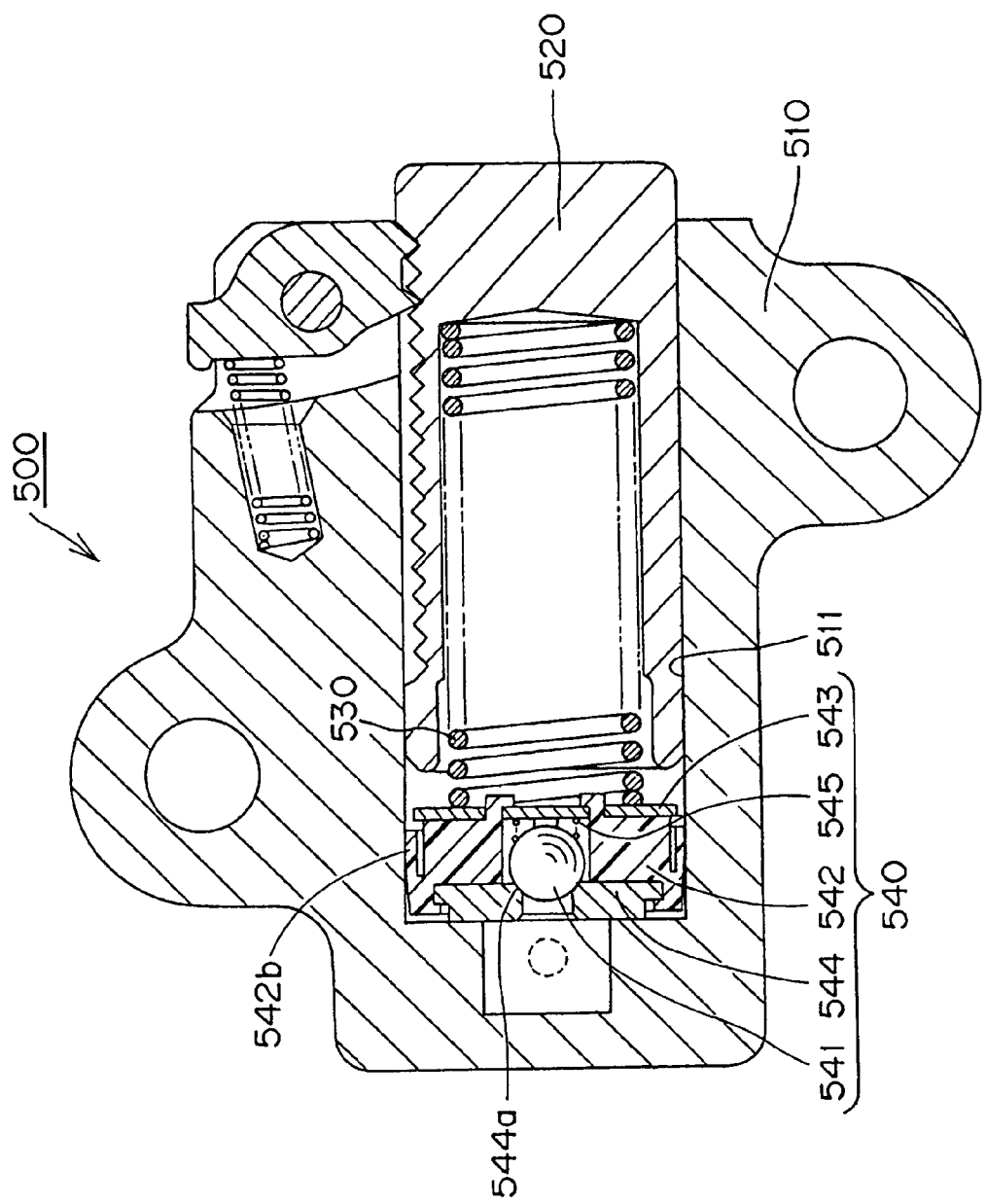
FIG. 6 is a cross-sectional view of a related hydraulic tensioner.
Figure 7:
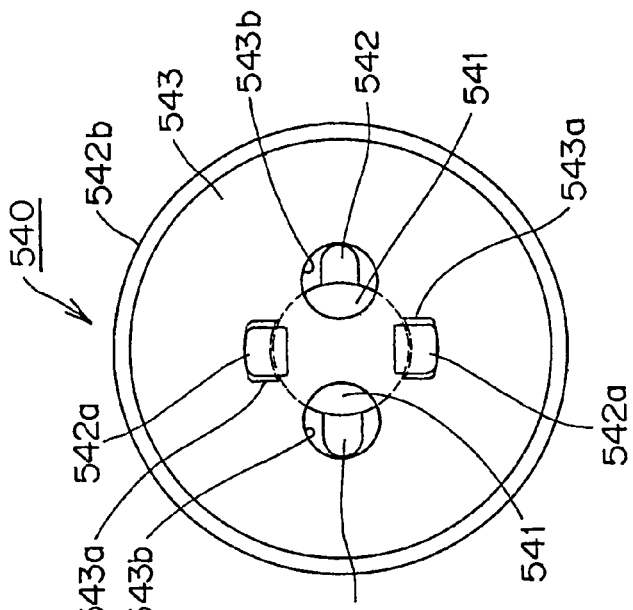
FIGS. 7(A), 7(B) and 7(C) are respectively an inlet end view, a side view, and an outlet end view of the check valve unit of FIG. 6.
Figure 7:
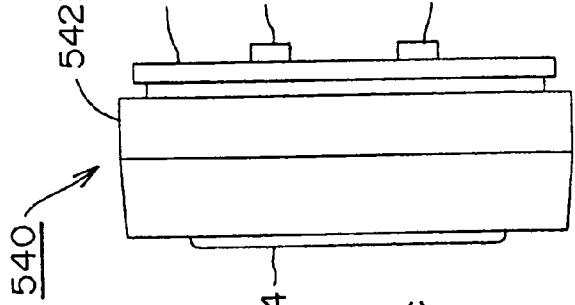
Figure 7:
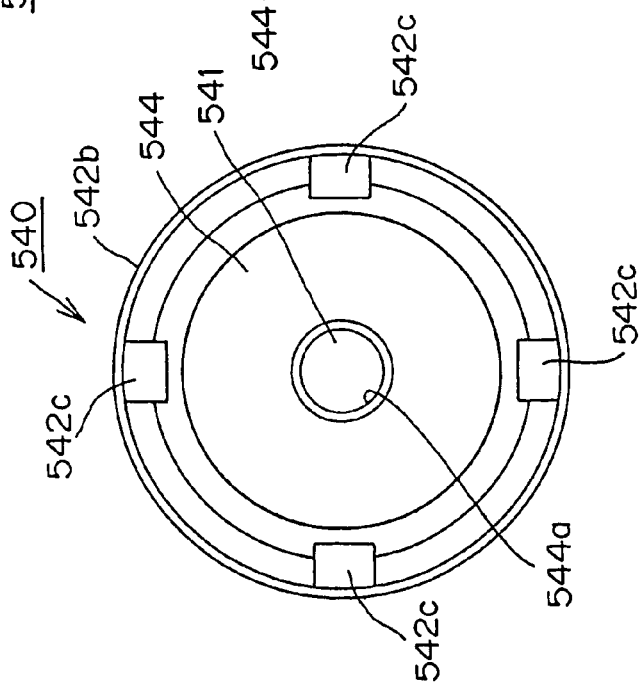

The disc-shaped retainer 143 is fixed to the ball guide 142 by crimping a portion of the ball guide over the retainer. Crimping a portion of the ball guide over the retainer in this manner provides a stronger assembly than in the case of the hydraulic tensioner 500 shown in FIGS. 6-7C. When the check valve unit 140 is incorporated into the plunger-accommodating hole 111, there is little risk of detachment of the retainer 143 from the ball guide. As shown in FIGS. 3 and 4(A), an outer circumferential tongue 142b is provided on the ball guide for pressing against the cylindrical side wall of the plunger-accommodating hole 111 in order to secure the check valve unit in place at the bottom of the plunger-accommodating hole. Oil communication holes 143a are bored in the retainer 143, as shown in FIGS. 3 and 4(C)

A step-shaped recess 143b is formed by the portion of the ball guide that is crimped over the retainer disc. This recess serves as a spring-positioning mounting recess, receiving a rear end of the plunger-biasing spring 130. Thus, the spring abuts the retainer 143 axially, and is reliably held against radial movement by engagement with the annular side wall of the recess 143b. By holding the end of the plunger-biasing spring 130 against radial displacement, the recess prevents wear and contact noise due to abnormal contact between the rear end of the plunger 120 and the spring.

The ball seat 144 is also fixed to the inflow side the ball guide 142 by an annular portion crimped over substantially the entirety of an annular peripheral region of the ball seat. Accordingly, the assembled check valve unit 140 can be incorporated into the bottom portion of the plunger-accommodating hole 111 without the risk of detachment of the ball seat 144 from the ball guide.

Because the ball guide 142 is used in the high temperature environment of an engine, the ball guide is preferably composed of a polyamide resin such as nylon 46, nylon 66, glass fiber-reinforced nylon or the like. Crimping is carried out by the application of heat, to soften the resin, and the crimped portions of the ball guide exhibit excellent shape retention.

The retainer 143, which maintains the check ball 141 within the ball guide 142 and at the same time is in abutting engagement with the rear end of the plunger-biasing spring 130, is preferably made of metal.

The check ball 141 may be composed of metal, ceramic, a synthetic resin, or the like, and has a diameter such that it can moved freely toward and away from the ball seat in the synthetic resin ball guide 142, its movement being limited by the ball seat and the retainer, respectively.

In the operation of the tensioner, the high pressure oil chamber R is always filled with oil supplied from the outside through the check valve unit 140 by an oil pump or the like. When the timing chain C loosens, the plunger 120, which is continuously biased in the protruding direction by the plunger-biasing spring 130, takes up slack in the chain. As the plunger moves in the protruding direction, the oil chamber R expands, and oil flows into the chamber through the check valve unit 140.

When the plunger 120 is pressed in the retracting direction by an impact force exerted by the timing chain C, the pressure of the oil in chamber R is increased, and the check ball 141 is pushed against the ball seat 144. Consequently, reverse flow of oil from the high pressure oil chamber R through the oil passage 144a of the ball seat 144 is blocked. As a result, the oil pressure in chamber R is further increased, and oil leaks through a slight clearance between the outer circumferential surface of the plunger 120 and the inner circumferential surface of the plunger-accommodating hole 111, and is discharged to the exterior of the tensioner housing 110. Consequently, vibration of the plunger 120 due to the impact force, which acts on the plunger 120 is quickly damped by flow resistance due to the viscosity of the oil.

As described above, in the hydraulic tensioner 100, since the disc-shaped retainer 143 is fixed to the high pressure oil chamber side of the ball guide 142 around substantially its entire circumference, the retainer 143 and the ball guide 142 can be easily and securely assembled without the need for careful positioning of the retainer 143 relative to the ball guide 142. Furthermore, the retainer and the plunger biasing spring 130 can be reliably positioned and assembled. Moreover, since the ball seat 144 is fixed to the inflow side of the ball guide 142 by crimping about substantially the entire outer circumference of the ball guide 142, the check valve unit 140 can be easily incorporated into the bottom portion of the plunger-accommodating hole 111 without detachment of the ball seat from the ball guide.

Figure 5:
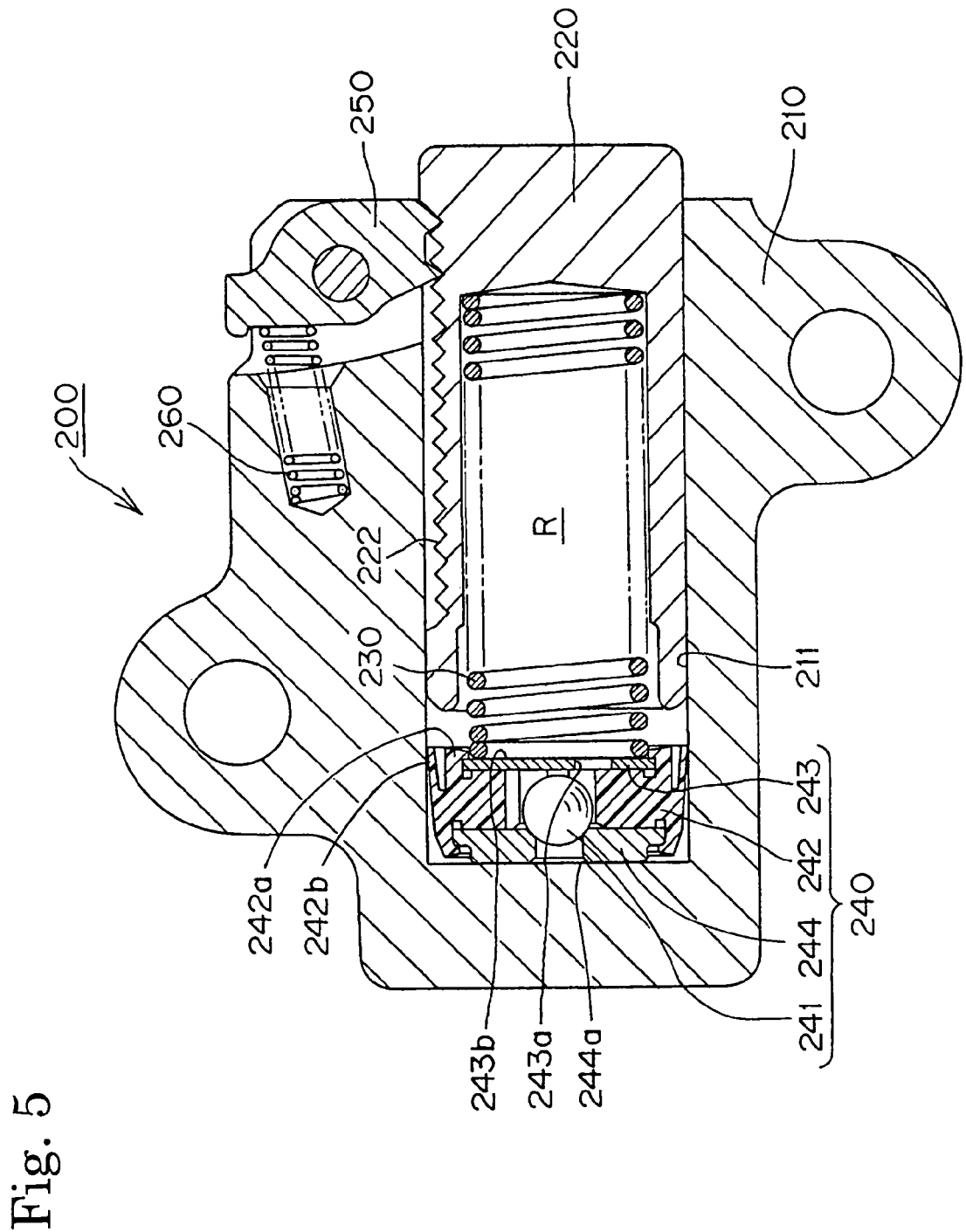
FIG. 5 is a cross-sectional view of a hydraulic tensioner in accordance with a second embodiment of the invention.

The hydraulic tensioner 200, shown in FIG. 5, is also mounted on an engine body in the same manner as tensioner 100. Tensioner 200 is different from tensioner 100 in that it includes a ratchet mechanism in which retracting movement of the plunger 220 is blocked by engagement between a rack 222 formed on the plunger 220, and a pawl 250 pivoted on the tensioner housing 210. A ratchet-biasing spring urges the ratchet pawl 250 toward the rack 222. Other features of the tensioner 200 are the same as those of tensioner 100. Therefore, elements of tensioner 200 that correspond to elements of tensioner 100 in the series 100 to 144 are denoted by corresponding reference numerals in the series 200 to 244.

In the check valve unit 240, a disc-shaped retainer 243 is fixed to a ball guide 242 by crimping of a portion of the ball guide over substantially the entirety of an annular circumferential area on the high pressure oil chamber side of the retainer. Thus, the check valve unit 240 is strongly assembled and the length of the crimped region is significantly greater than in the case of the check valve unit in the tensioner of FIGS. 6-7(C). Detachment of the retainer from the ball guide in the process of installation of the check valve unit in the tensioner housing is reliably prevented.

As in the case of the check valve unit of FIGS. 2-4(C), a step-shaped recess is formed by the crimped part of the ball guide for receiving and positioning the rear end of the plunger-biasing spring. This spring positioning recess avoids wear and contact noise due to abnormal contact between the rear end of the plunger 220 and the plunger-biasing spring 230.

The ball seat 244 is fixed to the ball guide on the inflow side by crimping around substantially the entire circumference of the ball seat. Accordingly, the check valve unit 240 can be reliably incorporated into the bottom portion of the plunger-accommodating hole 211, with little risk of detachment of the ball seat 244 from the ball guide.

The retainer 243 and the ball guide 242 can be easily and securely assembled without special efforts to position the retainer 243 and the ball guide 242 relative to each other. Moreover, the plunger-biasing spring 230 is reliably positioned relative to the ball guide during assembly of the tensioner. Furthermore, since the ball seat 244 is fixed to the ball guide 242 by crimping around substantially its entire circumference on the inflow side of the ball, the check valve unit 240 can be easily and securely incorporated into the bottom portion of the plunger-accommodating hole 211 without detachment of the ball seat from the ball guide.

I claim:

1. A hydraulic tensioner comprising:
    a housing having a plunger-accommodating hole formed therein, said hole having an opening at one end thereof, a bottom portion at the opposite end thereof, and a side wall;
    a plunger slidable in said plunger-accommodating hole and protruding therefrom, through said opening, for applying tension to a traveling flexible power transmission medium, said plunger and said housing together forming a high-pressure oil chamber;
    a plunger-biasing spring, accommodated in said high pressure oil chamber, said spring biasing the plunger in a protruding direction; and
    a check valve unit incorporated into the housing, within the plunger-accommodating hole and adjacent said bottom portion thereof, the check valve unit being arranged to allow flow of oil into said high-pressure oil chamber, and to prevent reverse flow of oil, said check valve unit having an outlet side facing said high pressure oil chamber and an opposite inflow side;
    wherein said check valve unit comprises a check ball, a ball seat on which said check ball can be seated to block reverse flow of oil out of the high pressure oil chamber, a ball guide in which the check ball is freely movable toward and away from said ball seat, and a disc-shaped retainer holding the check ball in the ball guide while allowing movement of the check ball within the ball guide toward and away from the ball seat, said disc-shaped retainer having a surface facing said high pressure oil chamber, and said surface having an annular peripheral region, the ball guide having an annular portion on the high pressure oil chamber side of the ball guide, a part of said annular portion surrounding said disc-shaped retainer and a part of said annular portion being crimped over substantially the entirety of said annular peripheral region of the disc-shaped retainer;
    wherein the ball guide of the check valve unit is composed of synthetic resin and is surrounded by a flexible tongue formed as a unit with the ball guide, said tongue pressing outwardly against the side wall of the plunger-accommodating hole and thereby holding the check valve unit adjacent said bottom portion of the plunger-accommodating hole by a press fit;

wherein said crimped annular portion of the ball guide forms a recess; and wherein an end portion of said plunger-biasing spring extends into said recess, bears axially against the disc-shaped retainer, and is engaged with said annular portion of the ball guide and thereby prevented from moving radially.

2. The hydraulic tensioner according to claim 1, in which said ball seat has an annular peripheral region and is fixed to said ball guide by an annular crimped portion of said ball guide on the inflow side thereof, said crimped portion being crimped over substantially the entirety of said annular peripheral region of said ball seat.

* * * * *